(12) United States Patent
Lam (10) Patent No.: US 8,216,732 B2
(45) Date of Patent: Jul. 10, 2012

(54) FUEL CELL POWER GENERATION SYSTEM

(75) Inventor: Alex Lam, Burnaby (CA)

(73) Assignee: British Columbia Hydro and Power Authority, Vancouver (CA)

( * ) Notice: Subject to any disclaimer, the term of this patent is extended or adjusted under 35 U.S.C. 154(b) by 1248 days.

(21) Appl. No.: 11/661,892

(22) PCT Filed: Sep. 23, 2005

(86) PCT No.: PCT/CA2005/001454
§ 371 (c)(1),
(2), (4) Date: Mar. 1, 2007

(87) PCT Pub. No.: WO2006/032147
PCT Pub. Date: Mar. 30, 2006

(65) Prior Publication Data
US 2007/0254193 A1    Nov. 1, 2007

(30) Foreign Application Priority Data
Sep. 24, 2004    (CA) ..................................... 2482486

(51) Int. Cl.
*H01M 8/04* (2006.01)
*H01M 8/24* (2006.01)
(52) U.S. Cl. .................. 429/431; 429/432; 429/470
(58) Field of Classification Search ........................ None
See application file for complete search history.

(56) References Cited

U.S. PATENT DOCUMENTS

| | | | |
|---|---|---|---|
| 6,503,649 B1 * | 1/2003 | Czajkowski et al. | 429/430 |
| 6,764,785 B2 * | 7/2004 | Colborn et al. | 429/430 |
| 2003/0077493 A1 | 4/2003 | Colborn et al. | |
| 2004/0033398 A1 * | 2/2004 | Kearl et al. | 429/22 |
| 2005/0112428 A1 | 5/2005 | Freeman et al. | |

FOREIGN PATENT DOCUMENTS

| WO | WO 2004/027912 | 4/2004 |
|---|---|---|
| WO | WO 2005/027305 A1 | 3/2005 |

OTHER PUBLICATIONS

Hydrogenics Corporation, HyPORT C Product Brochure, Jun. 2002, Mississauga, Canada.
Hydrogenics Corporation, HyUPS Product Brochure, Sep. 2002, Mississauga, Canada.
Hydrogenics Corporation, HyPORT-E Product Brochure, Feb. 2003, Mississauga, Canada.

(Continued)

*Primary Examiner* — Barbara Gilliam
*Assistant Examiner* — Stephan Essex
(74) *Attorney, Agent, or Firm* — Ryan A. Schneider, Esq.; Troutman Sanders LLP (57) ABSTRACT

An electric power generator is particularly suitable for providing back-up power to sites with multiple power requirements. This generator comprises a rack having multiple module bays; at least one power conversion module is mounted in one of the bays and is electrically coupled to a fuel cell stack also mounted in the rack or located remote from the rack. The power conversion module converts the voltage level and/or current type of some of the electricity produced by the stack such that the generator can simultaneously output electricity at multiple voltage levels and/or current types. The rack can be a standardized nineteen relay rack, making the generator relatively compact and compatible with sites configured accept such racks.

10 Claims, 6 Drawing Sheets

OTHER PUBLICATIONS

Alex W. Lam, Battery and Hydrogen Fuel Cell, Battcon 2003 Proceedings, May 2003.

Hydrogenics Corporation, HyLYZER Product Brochure, Jun. 2003, Mississauga, Canada.

Ballard Power Systems Inc., Nexa RM Series Product Brochure, Sep. 2003, Burnaby, Canada.

Hydrogenics Corporation, HyPM 10 Product Brochure, Nov. 2003, Mississauga, Canada.

Hydrogenics Corporation, HySTAT, http://www.hydrogenics.com/products_systems_hystat.asp.

BC Hydro, BC Hydro Begins Hydrogen Fuel Cell Field Trial With Ballard Power Systems' Nexa RM Series, Jul. 12, 2004 News Release.

Alex Lam, Presentation: Hydrogen Fuel Cell Power Supply, Canadian Hydrogen Conference 2004 Proceedings, Sep. 27, 2004.

Alex Lam, Paper: Hydrogen Fuel Cell Power Supply, Canadian Hydrogen Conference 2004 Proceedings, Sep. 27, 2004.

Alex Lam, Presentation: Hydrogen Fuel Cell Power Supply, Eurofourm Batteries Congress 2005 Proceedings, Jun. 2005.

* cited by examiner

FUEL CELL POWER GENERATION SYSTEM

BENEFIT CLAIMS

This application is a US National Stage of International Application No. PCT/CA2005/001454, filed 23 Sep. 2005, which claims the benefit of CA 2,482,486, filed 24 Sep. 2004.

FIELD OF THE INVENTION

This invention relates generally to a system for generating electrical power using hydrogen fuel cells.

BACKGROUND OF THE INVENTION

Reliability of a customer's power supply is a primary concern for a utility. In order to provide reliable and continuous power, the utility tries to ensure that its equipment is always in working order. Utilities typically have generating stations, sub-stations, and telecommunications, system control and computer networks that should be operating at all times. To ensure continuous operation, many of these systems are provided with back-up power sources for providing temporary power whenever their main power sources are disrupted.

For example, a utility may have a communications network that includes microwave repeater stations that relay information between sites. These stations can be located in remote locations such as on a mountaintop, and must be provided with back-up power generation means to ensure that the station remains operational when its primary power source (e.g. commercial distribution power via ground lines) is interrupted. Typically, such stations are fitted with a back-up diesel generator and a number of lead acid batteries. When the primary power supply is disrupted, the diesel generators and batteries are activated to provide nominal A/C and D/C power for periods of time sufficient for repair crews to effect necessary repairs.

Because stations can be located in difficult-to-access wilderness locations, the stations are provided with large stores of diesel fuel and large numbers of lead acid batteries to ensure that enough back up power is available in the event repair crews are delayed in reaching the stations. Such remote stations present an environmental concern, as the large stores of diesel fuel and battery electrolyte pose a significant environmental hazard. As these locations are hard to reach, timely clean up of fuel or electrolyte spills are particularly difficult.

It is therefore desirable to minimize or eliminate the environmental risk that such stations pose by providing a back-up power source that is relatively environmentally friendly. Furthermore, such back up power source should be relatively light and compact: existing back up equipment comprising diesel generators, diesel fuel storage, and batteries tend to be relatively heavy; as access to remote stations can often only be made by helicopter, transporting such equipment and fuel tends to be expensive. Therefore, it is desirable to reduce the weight of the back up equipment and associated fuel to reduce the costs associated with constructing and maintaining such stations.

A similar need for reliable back-up power exists for utility sub-stations and generating stations. A substation serves to transform voltage from one level to another level. A power generating station generates electrical power from an energy source such as coal, gas or water. Presently, substations and generating stations are typically provided with lead-acid battery back-up systems to enable the substation and generating stations to perform a "black start" during a blackout, i.e. when power from a commercial distribution ground line is interrupted. Failures of lead-acid battery based back up systems to operate properly during blackouts have prompted utilities to examine alternative sources for back-up power.

Fuel cell technology has long been touted a commercially viable and environmentally superior alternative to internal combustion based power sources. Generally speaking, fuel cells electrochemically combine hydrogen fuel and oxidant to produce electricity, water and heat. One type of fuel cell is a proton exchange membrane (PEM) fuel cell; such fuel cells employ a membrane electrode assembly (MEA) which comprises an ion exchange membrane or solid polymer electrolyte disposed between two electrodes typically comprising a layer of porous, electrically conductive sheet material, such as carbon fiber paper or carbon cloth. The MEA contains a layer of catalyst, typically in the form of finely comminuted platinum, at each membrane/electrode interface to induce the desired electrochemical reaction. In operation the electrodes are electrically coupled to provide a circuit for conducting electrons between the electrodes through an external circuit. Typically, a number of MEAs are serially coupled electrically to form a fuel cell stack having a desired power output.

Due to their zero- or low-emission nature, and ability to operate using renewable fuels, the use of fuel cells as primary and/or backup power supplies is promising. For example, a fuel cell stack have be contemplated for service as an uninterruptible power supply for computer, medical, or refrigeration equipment in a home, office, or commercial environment. However, actual implementation of such fuel cell systems in real world applications have been very limited, as there are significant technological hurdles to overcome to ensure the fuel cell systems can effectively and reliably operate in the field. One particular challenge is to provide a cost-effective and compact fuel cell system that can be readily adapted to provide power at a site having multiple electrical devices with different voltage and current requirements.

SUMMARY

It is a general objective of the invention to provide a system for generating electrical power using hydrogen fuel cells. A particular objective is to provide a fuel cell power generation system that is suitable for providing power to sites having multiple DC and/or AC power requirements, especially sites in remote locations requiring a back up power source.

According to one aspect of the invention, there is provided an electric power generator that is particularly suitable for providing back-up power to sites with multiple power requirements. This generator comprises: a rack having multiple module bays; at least one fuel cell stack mounted in one of the bays; and at least one power conversion module mounted in one of the bays. The power conversion module is electrically coupled to the fuel cell stack and converts the voltage level and/or current type of some of the electricity produced by the stack such that the generator can simultaneously output electricity at multiple voltage levels and/or current types. The rack can be a standardized nineteen relay rack, making the generator relatively compact and compatible with sites configured accept such racks.

Multiple power conversion modules can be installed in the rack, such as at least one DC-DC converter and at least one DC-AC inverter. The fuel cell stacks and power conversion modules can be removably mountable in the rack such that different numbers and/or combinations of fuel cell stacks and power conversion modules can be mounted in the rack to meet different power requirements, enabling the system to be readily adaptable to different sites. For example, the generator can be configured to provide back-up power to a microwave repeater station having multiple devices operating on DC power of differing voltages, and on AC power.

The generator can have a DC power bus that is electrically communicative with each fuel cell stack bay and the power conversion modules. Each fuel cell stack that is removably mountable to a fuel cell stack bay is configured to electrically couple to the power bus when mounted. The power bus can have an electric outlet for coupling to electrically powered devices which operate on the same voltage as the fuel cell stacks.

The generator can further comprise an output bus assembly that is electrically communicative with each power conversion module bay, and has at least one outlet for coupling to an electrically powered device. Each power conversion module that is removably mountable to the power conversion bays is configured to electrically couple to the output bus assembly when mounted. The output bus assembly can have multiple output buses each electrically communicative with at least one of the power conversion module bays. Each output bus and each power conversion module has a power conversion rating; each power conversion module is configured to electrically couple to the output bus with the same rating when mounted in the power conversion module bay. In particular, each output bus can occupy a different position in each power conversion module bay and the power output terminals of each power conversion module is selectively positioned to couple with the output bus having the same power conversion rating when the power conversion module is mounted in one of the bays.

The generator can have a design load and at least one more fuel cell stack than is required to meet the design load. In such case, the generator would further comprise means for electrically decoupling at least one fuel cell stack from the generator and switching an operating load to the remaining coupled fuel cell stack or stacks. The operating load can be shared between all the fuel cell stacks to reduce stress on the stacks. When one of the stacks fail, the generator can switch the operating load to the remaining functioning stacks until the failed stack can be replaced. Alternatively, the operating load can be shared between the minimum number of fuel cell stack(s) required to meet the design load, with the remaining fuel cell stack(s) electrically decoupled from the generator and maintained in standby mode. When one of the operating stacks fail, the generator can activate the stack(s) in standby mode.

According to an alternative aspect of the invention, the power generator can comprise a metering and power conversion module mounted in one of the bays; this metering and power conversion module has at least one internal power conversion device that is electrically coupled to the fuel cell stack, and meters for monitoring the performance of the stack and multiple power outputs. Such a generator can also have one or more power conversion modules that are removably mounted in the rack bays and electrically coupled to the fuel cell stack. For example, the internal power conversion device can be a DC-DC converter, and the power conversion module can be a DC-AC inverter.

According to another alternative aspect of the invention, the power generator can have a rack with multiple module bays that are configured to receive at one least power conversion device, and a power bus for coupling to one or more fuel cell stacks that are remotely located from the rack. One or more removably mountable power conversion devices are mounted in the rack and are electrically coupled to the remote stacks via the power bus. The generator can have an output bus assembly electrically coupled to the power conversion device(s) and having at least one outlet for coupling to at least one electrically powered device. Additionally, the power bus can have at least one power outlet for coupling to at least one electrically powered device operating at the same voltage as the fuel cell stack output.

BRIEF DESCRIPTION OF THE DRAWINGS

FIGS. 1(*a*) and (*b*) are respective front and side views of a fuel cell power generation system according to a first embodiment of the invention, and having four fuel cell stacks mounted in a standard relay rack.

FIGS. 3(*a*) to (*d*) are respective front, side, rear, and plan views of a metering and power conversion module of the first embodiment of the fuel cell power generation system.

FIGS. 5(*a*) and (*b*) are schematic front views of a fuel cell generation system according to a second embodiment of the invention, wherein FIG. 5(*a*) illustrates a relay rack housing a control module and a metering module, and having bays for housing power conversion modules and fuel cell stacks; and FIG. 5(*b*) illustrates the rack housing the control module, metering module, one power conversion module and four fuel cell stacks; FIG. 5(*b*) also illustrates the rear view of two power conversion modules that are not mounted in the rack.

DETAILED DESCRIPTION OF EMBODIMENTS OF THE INVENTION

Referring to FIGS. 1-6, an electrical power generation system 10 is provided that can simultaneously supply a site with AC and DC electrical power at multiple voltages. The system 10 comprises fuel cell stacks 12 that produce electricity by electrochemically reacting hydrogen and oxygen. The system 10 is a compact modular design having rack-mountable components compatible with a standardized nineteen inch relay rack; this design enables easy swapping of power conversion components within the system 10 to suit a particular site's power needs.

FIGS. 1-4 relate to a first embodiment of the invention. The system 10 shown in FIGS. 1(*a*) and (*b*) has a standardized relay rack 14, or "nineteen inch rack" as popularly referred to in the telecommunications and computing industries. The rack 14 is a standardized (EIA 310-D, IEC 60297 DIN 41494 SC48D) system for mounting various modules in the rack 14. The rack 14 consists of two long, thin metal plates 15 standing vertically in the same plane with a space of approximately eighteen inches between them. Sliders (not shown) are mounted to each plate 15 at vertical intervals to define bays to receive components within the rack 14. It is within the scope of the invention to modify the rack height to provide more or fewer component bays.

The system 10 comprises multiple components that are configured to mount within the rack 14; in particular, the components each have a width and depth that correspond to the rack's width and depth, and a height that is a multiple of a standard unit of rack height, known as a "U". One U is 1.75 inches (44.45 mm). These components include one or more fuel cell stacks 12, a metering and power conversion module 16, and one or more power conversion modules 18. The system 10 also has a monitoring, annunciation and control module ("MAC module") 17 shown schematically in FIG. 4. The MAC module 17 monitors and controls operation of the power conversion components and the metering and power conversion module 16, and is communicative with an external communications network. In this embodiment, the MAC module 17 is located remote from the rack 14; however, it is within the scope of the invention for the MAC module 17 to be mounted on the rack 14.

Figure 1A:
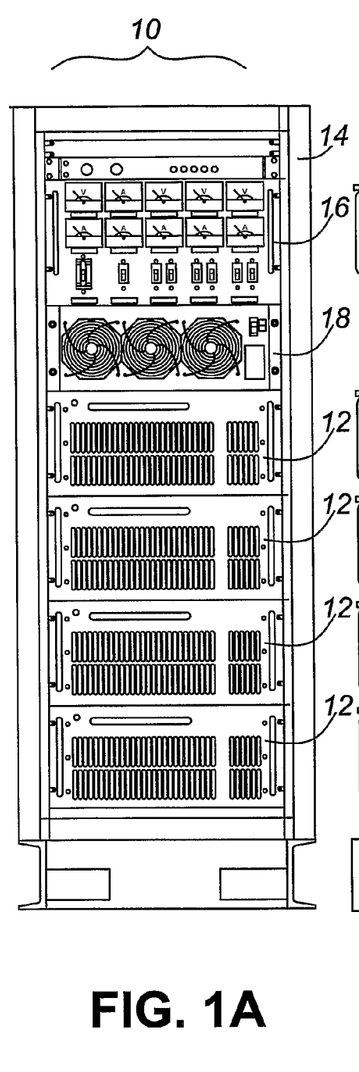
Figure 1B:
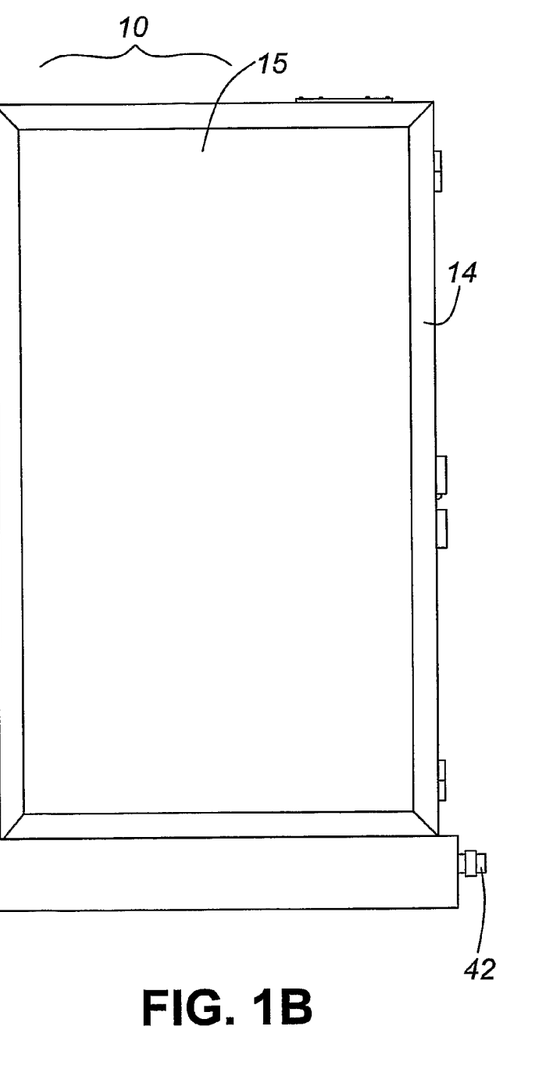

The system 10 configuration shown in FIG. 1 has a pair of DC-DC converters mounted inside the metering and power conversion module 16 and one rack-mounted power conversion module 18, namely, a DC-AC power inverter. However, as will be discussed in greater detail below, different numbers and combinations of power conversion modules 18 can be installed as required to meet the power requirements of the site.

Four fuel cell stacks 12 are mounted in the bottom four bays of the rack 14. Each fuel cell stack 12 is housed within a housing that is sized to fit within a rack bay. Each stack 12 has power outputs (not shown) that extend out of the back of the stack housing and electrically couple to a DC power bus 20 located in the back of the rack 14. The electric coupling is shown schematically in FIG. 2. A blocking diode 19 is provided at the coupling between the stack power outputs and the power bus 20. The fuel cell stacks 12 in this embodiment are NEXA® RM series PEM fuel cell stacks manufactured by Ballard Power Systems Inc. of Burnaby, British Columbia. The fuel cell stacks 12 are each configured to provide a power output in 1 kW, 24 VDC nominal (regulated) at 40 amps steady state from a supply of gaseous hydrogen and oxygen. Hydrogen is obtained from hydrogen fuel tanks 23 via hydrogen piping 22, and oxygen is obtained from ambient air.

Figure 2:
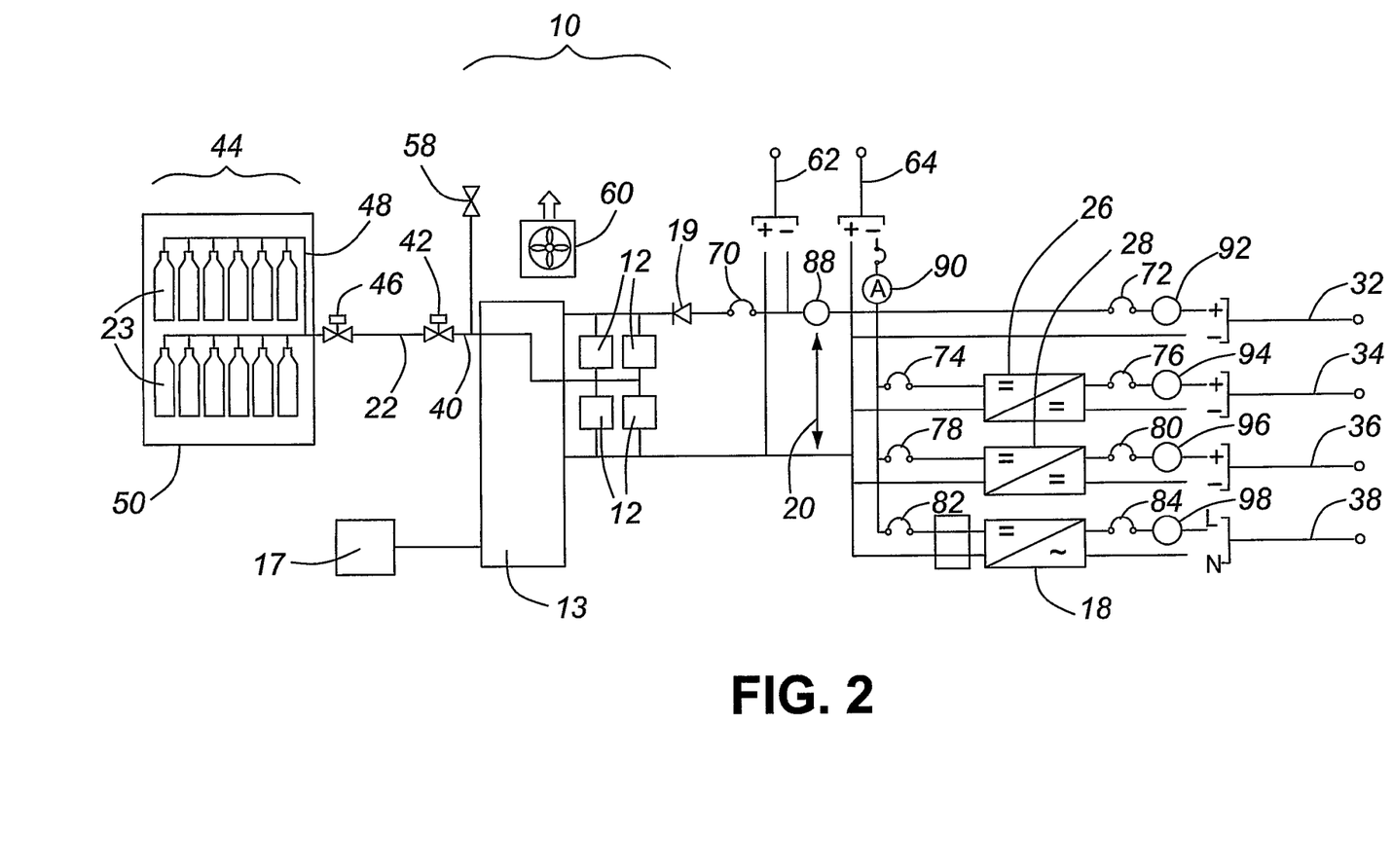
FIG. 2 is a simplified power wiring and hydrogen piping schematic of the fuel cell power generation system according to the first embodiment of the invention.

Continuing to refer to FIG. 2, the four fuel cell stacks 12 of this embodiment are arranged into two series-connected pairs. Each pair produces 48 VDC and are coupled together in a parallel electrical connection, thereby resulting in a total stack output of 48 VDC through the DC power bus 20. However, as discussed below, other stack outputs and electrical connection arrangements can be made within the scope of this invention.

Figure 4:
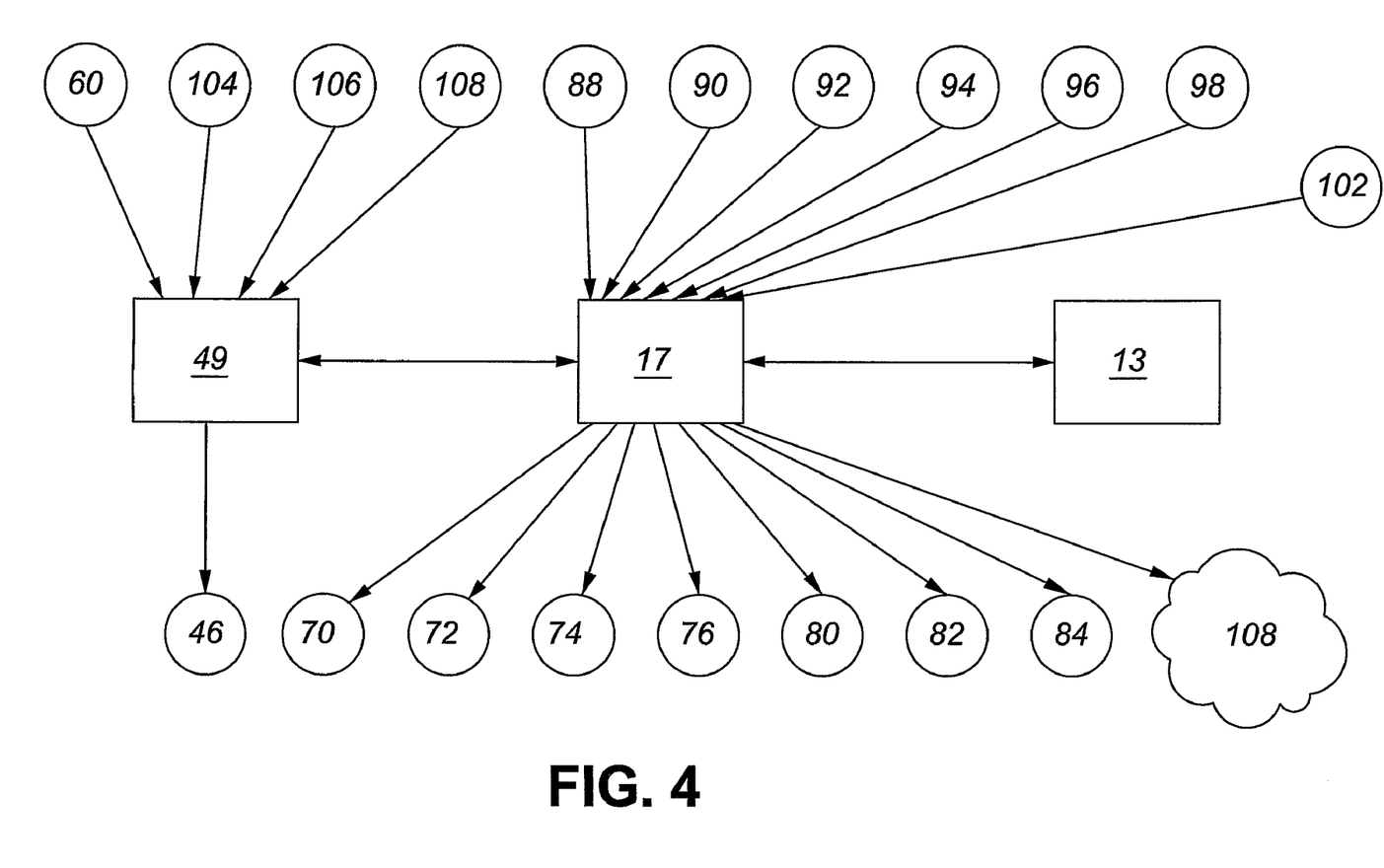
FIG. 4 is a simplified communications wiring schematic for the first embodiment of the fuel cell power generation system.

A rack controller 13 is communicative with the fuel cell stacks 12 and is mounted to the back of the fuel cell stacks 12. The rack controller 13 is programmed to monitor and control the operation of the fuel cell stacks 12 and is communicative with the MAC module 17 to transmit "output system OK" and "output requested" outputs, as shown in FIG. 4. The rack controller 13 can be readily programmed by the stack manufacturer to communicate additional data as needed by the system 10, e.g. additional contacts can be programmed to output additional data such as stack temperature, voltage, and current.

While the system 10 is particularly suitable for use with the Ballard fuel cell stacks 12, other fuel cell stacks that produce the required power and meet the system design specifications can be readily substituted, e.g. fits within the stack housing, and has fuel, communications and power connections that mate with the corresponding connections at the back of the rack 14. Such alternative fuel cell stacks can be PEM stacks, or other fuel cell types as is known in the art, such as solid oxide fuel cell (SOFC) stacks. Such stacks can operate with pure gaseous hydrogen, or from a reformate produced from a reformer as is known in the art. The alternative stacks can have the same output rating as the Ballard stacks 12, or have a different rating. For example, when the system 10 is intended for use at a microwave repeater station demanding up to 3 KW of power, four 1 KW Ballard or equivalent stacks are sufficient to meet the demand. However, when the system 10 is used in higher output applications, e.g. at a substation or a generating station, stacks 12 having higher output rating can be substituted. Alternatively or additionally, a greater number of stacks 12 can be provided.

Figure 3A:
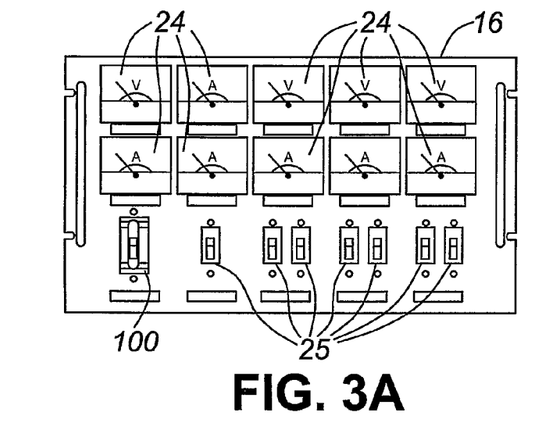
Figure 3B:
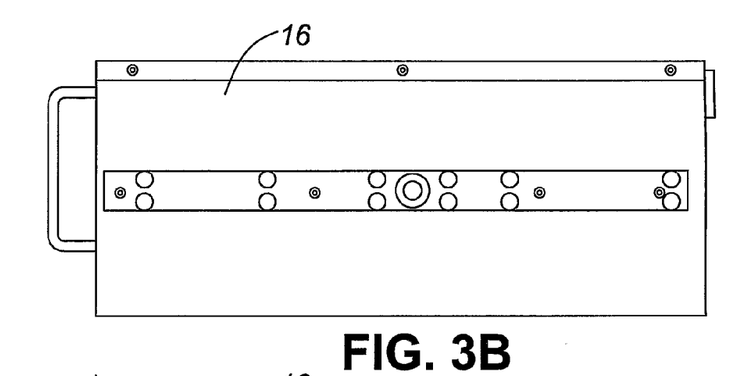
Figure 3C:
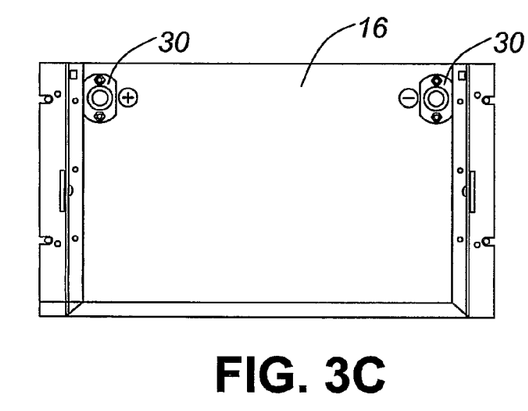
Figure 3D:
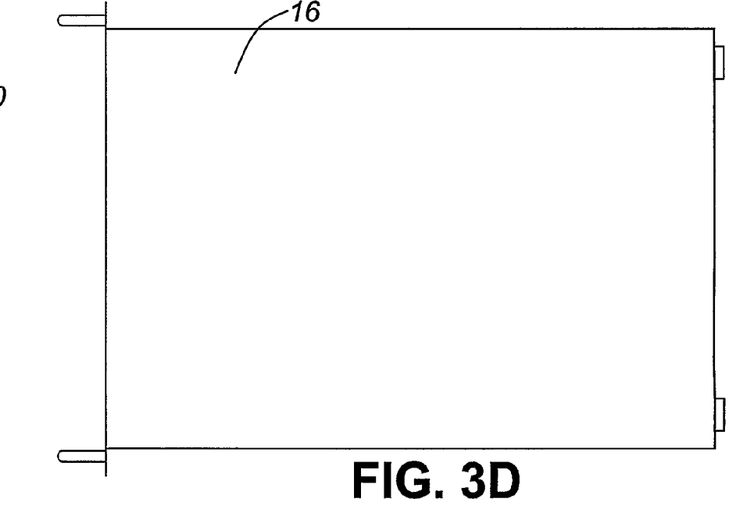

The DC power bus 20 is electrically coupled to multiple power conversion devices that enable the system to provide electrical power at different voltages and current types. In particular, the DC power bus 20 is electrically coupled to a pair of DC-DC converters 26, 28 located inside the metering and power conversion module 16, and to the DC-AC inverter 18 which is located in its own rack-mountable housing. As shown in FIG. 3(c), the DC power bus 20 couples to the DC-DC converters 26, 28 via terminals 30 located at the back of the metering and power conversion module 16 and to the inverter 18 via terminals (not shown) at the back of the inverter 18.

The metering and power conversion module 16 also is provided with meters 24 to monitor the system's power outputs and switches 25 to control each power output. The metering and power conversion module 16 also serves to convert 48 VDC electricity produced by the fuel cell stacks 12 into a plurality of DC voltages, namely, 48 VDC at outlet 32, 24 VDC at outlet 34, and 12 VDC at outlet 36; all the DC outlets 32, 34, 36 are mounted to the back of the metering and power conversion module 16. The 48 VDC output is provided by coupling the 48 VDC outlet 32 directly to the DC power bus 20 without any intervening power conversion. The 24 VDC and 12 VDC outlets 34, 36 are respectively coupled to power output terminals of the 48-24 VDC converter 26 and 48-12 VDC converter 28. The power inverter 18 contains the necessary components for converting the 48 VDC electrical output from the fuel cell stacks 12 into 120 VAC power. The inverter's input end is hardwired to the DC power bus 20 and the inverter's output end is wired to an AC outlet 38 located in the back of the inverter housing.

The power outlets 32, 34, 36, 38 are particularly suitable for providing back-up power to various devices in a utility repeater station: the 48 VDC outlet 32 can provide 48 VDC power to a microwave repeater unit (not shown) for relaying data signals, the 24 VDC outlet 34 and 12 VDC outlet 36 can each provide power to a VHF radio (not shown) for relaying voice signals, and AC power can provide AC power to an air compressor (not shown) that serves to prevent condensation in a microwave wave guide of the microwave repeater unit.

Optionally, different and/or additional output voltages and/or current types can be provided depending on a site's power needs. As described in detail below, additional AC or DC outputs can be provided by adding additional converters and/or inverters into empty rack bays.

As shown in FIGS. 1(b) and 2, each stack 12 has a hydrogen gas fuel inlet (not shown) that extends out of the back of the stack housing and fluidly couples to a hydrogen manifold 40 located at the back of the rack 14. The hydrogen manifold 40 is fluidly coupled to a rack hydrogen control valve 42 located at the rear base of the rack 14. The rack hydrogen control valve 42 in turn is fluidly coupled by hydrogen piping 22 to a hydrogen supply assembly ("HSA") 44 comprising a HSA hydrogen control valve 46 coupled to the hydrogen piping 22, a header 48 coupled to the HSA hydrogen control valve 46, and fuel tanks 23 fluidly coupled to the header 48. These fuel couplings are shown schematically in FIG. 2. Air reaches the fuel cell stack 12 via vents in the housing walls (not shown).

The fuel tanks 23 are industry standard pressure tanks for storing hydrogen gas under pressure. Suitable such tanks are hydrogen storage tanks manufactured by Dynetek Industries Ltd. of Calgary, Alberta. For supplying back up power to remote repeater stations, it is desirable to install twelve 5000 psig gaseous hydrogen storage tanks to provide continuous back up power for up to three days depending on load demands. However, a different number of storage tanks with different pressure ratings can be provided depending within the scope of the invention.

Pressure regulators (not shown) are coupled to the header 48 to reduce the operating pressure of the fuel cell stacks 12. A pressure meter (not shown) is coupled to the pressure regulator and a flow rate meter (not shown) is coupled to the header 48 upstream of the regulator.

Optionally, the system 10 and HSA 44 can be housed in separate protective enclosures (not shown). Alternatively, a singe enclosure (not shown) can be provided with a partition wall that separates the enclosure into two rooms. The system 10 is housed in one room and the hydrogen supply assembly 44 is housed in another room; the partition wall can be substantially fluidly sealed to impede gas flow between the two rooms. Such sealing is desirable to reduce the chances of explosion caused by hydrogen leaked from the tanks 23 which comes into contact with electrical components in the system 10. The enclosure enables the system 10 and hydrogen supply assembly 44 to be stored outside of the repeater station, and can be insulated and otherwise configured to protect the system components and hydrogen supply assembly 44 from the environment. The enclosure should be provided with an air intake to ensure sufficient oxidant is available for the fuel cells, and a water drain to collect and remove product water produced by the electrochemical reaction (both not shown). Alternatively and as shown schematically in FIG. 2, the rack components of the system 10 can be installed inside a pre-existing site enclosure (e.g. inside a microwave repeater station) and the hydrogen supply assembly 44 can be housed in a separate external enclosure 50 remote from the site enclosure. In this case, the hydrogen supply piping 22 can be extended to couple the tanks 23 to the fuel cell stacks 12.

A pressure relief valve 58 is coupled to the hydrogen piping 22 upstream of the fuel cell stacks 12, and is located near vents in the ceiling of the station. The valve 58 is configured to open when the hydrogen supply pressure exceeds a predefined threshold. As hydrogen is lighter than air, hydrogen gas vented through the relief valve 58 will dissipate into the atmosphere. As a safety precaution, an exhaust fan 60 is provided near the top of the rack 14 and facilitates air flow exchange between the inside and outside of the rack 14, to prevent hydrogen from accumulating in the vicinity of the system 10. The fan 60 is located in the vicinity of the fuel cell stacks 12 and the metering and power conversion module 16 and also serves to cool the stacks 12 and other heat producing components. A suitable cooling fan is a 102 CFM 48 VDC muffin fan, model no. 030573. The fan 60 is powered by the system 10 and is electrically coupled to the inverter 18.

In addition to the DC-DC outlets 32, 34, 36, the metering and power conversion module 16 also includes an auxiliary input terminal 62 and a battery terminal 64. These terminals 62, 64 are electrically coupled to the power bus 20 which also serves to couple the outlets 32, 34, 36, 38 and terminals 62, 64 to the fuel cell stacks 12. The auxiliary input terminal 62 is used to connect the system 10 to an external DC power source that can be used to supply power to each of the outlets 32, 34, 36, 38; in such case, circuit breaker 70 is opened to disconnect the stacks 12 from the outlets 32, 34, 36, 38. The battery terminal 64 can be coupled to a pack of external rechargeable batteries (not shown) such as those found in a conventional diesel powered back-up power system for repeater stations. The system 10 would take the place of the diesel generator in the back-up power system: the batteries can be used to provide immediate back-up power when the primary power supply is interrupted and operate long enough for the fuel cell stacks 12 to reach normal operating status. When the fuel cell stacks 12 are fully operational, they can be used to recharge the batteries.

Instead of using external batteries, the system 10 can be provided with internal batteries, e.g. on board each fuel cell stack 12, to supply sufficient back up power until the fuel cell stacks 12 are fully operational.

The two DC-DC converters 26, 28 can be those manufactured by Absopulse, such as models BAP65-P3326 and DCW150-12-FT respectively. The inverter 18 has a power input terminal that is hardwired to the DC power bus 20; a suitable inverter is a 1500 VA 48 VDC to 120 VAC type inverter such as those manufactured by Absopulse, such as model CSI-1.5K-4-19"-A. A current transformer (not shown) is coupled to the inverter output and serves to reduce the AC output current from 50 A to 5 A; a suitable such transformer can be one made by Electro-meters, model no. 2SFT-500. A voltage transformer (not shown) is coupled to the current transformer and serves to transform the AC voltage from 115V:25 VCT; a suitable such transformer can be on made by Frost, model no. TRC-25F. Optionally, a 115 V A/C outlet (not shown) can be electrically coupled between the inverter 48 and the AC voltage and current transformers to provide 115 VAC output.

Various circuit breakers are installed at various locations in the system 10 to interrupt electricity flow between system components; these circuit breakers are communicative with switches located at the front of the metering and power conversion module 16 to enable an operator to control the system 10 on site, as well as to the MAC module 17 to enable the operator to control the system 10 remotely. In particular, a 100 ADC, 65 VDC 25 KAIC, AUX SW circuit breaker ("fuel cell output circuit breaker") 70 is located inside the metering and power conversion module 16 and is electrically coupled on the power bus 20 immediately downstream of the blocking diode 19; a suitable such circuit breaker is manufactured by Heinemann, model no. CD1-B2-U-0100-02C. Additional circuit breakers are installed in the metering and power conversion module 16 between the DC bus 20 and each of the DC outlets, namely: a 60 A 48 VDC output circuit breaker 72 for cutting the 48 VDC output from the 48 VDC outlet 32, a 10 A input circuit breaker 74 and 12 A output circuit breaker 76 coupled upstream and downstream of the 48-24 VDC converter 26; a 5 A input circuit breaker 78 and a 12 A output circuit breaker 80 coupled upstream and downstream of the 48-12 VDC converter 28. Also, a 50 A inverter input circuit breaker 82 and a 15 A inverter output circuit breaker 84 are coupled upstream and downstream of the inverter 18. Suitable circuit breakers are known in the art, and can for example, be obtained from Heinemann.

A number of sensors are installed in the system 10 to monitor the operation of the system 10. A fuel cell output voltage meter (0-75 VDC) 88 is coupled between on the DC bus 20 downstream of the blocking diode 19 to measure total fuel cell stack output voltage; a battery current meter (100-1-100 ADC, 50 mV Shunt) 90 is coupled at the battery terminal 64 to monitor current drain from terminal 64; a fuel cell output current meter (0-100 ADC, 50 mV Shunt) 92 is coupled at the 48 VDC outlet 32 to measure total fuel cell stack 12 current output; DC current and voltage meters are installed at each of the DC outputs, namely: a 24 VDC current and voltage meters (0-30 VDC, 0-15 ADC, 50 mV shunt) 94 at the 24 VDC output 34; and a 12 VDC current and voltage meters (0-15 VDC, 0-15 ADC, 50 mV shunt) 96 at the 12

VDC output 36. Also, output voltage and current inverter meters (0-150 VAC, 0-15 AAC) 98 are installed at the AC outlet 38.

Referring to FIGS. 3(a) to (d), the DC-DC converters 26, 28, circuit breakers 72, 74, 76, 80, 82, 84, and meters 88, 90, 92, 94, 96, 98 are all located inside the metering and power conversion module 16. At the front of the metering and power conversion module 16 are multiple displays 24 and switches 25. Each display 24 is communicative with one of the meters 88, 90, 92, 94, 96, 98 and displays the readings taken by each meter 88, 90, 92, 94, 96, 98. The switches 25 are each communicative with one of the circuit breakers 72, 74, 76, 80, 82, 84 and can be toggled to isolate or connect each of the outlets 32, 34, 36, 38 from the fuel cell stacks 12. A master switch 100 is coupled to circuit breaker 70 to isolate or connect the fuel cell stacks 12 from the system 10. These displays 24 and switches 25, 100 enable an operator on site to directly monitor and manually control the operation of the system 10.

Referring to FIG. 4, each of the meters 88, 90, 92, 94, 96, 98 are electrically communicative with and send data to the MAC module 17. The MAC module 17 is communicative with and controls the operation of each of the circuit breakers 70, 72, 74, 76, 80, 82, 84. The MAC module 17 is communicative with and receives data from the rack controller 13, namely, "system output OK" and "output requested" inputs. The former input indicates that the fuel cell stacks 12 are in ready operating condition and the latter input indicates that the fuel cells require hydrogen fuel from the tanks 23. Additional inputs can be established between the MAC module 17 and the rack controller 13 if additional information is desired from the fuel cell stacks 12. The MAC module 17 is communicative with and controls operation of the fuel cell stacks 12 via the rack controller 13. The status of the primary power supply (AC power grid) is monitored by a dedicated sensor 102 or by a like sensor in the battery charger if the system 10 is coupled to back-up batteries. An external communications port connects the MAC module 17 to the utility's communications network 108, and allows operators at locations remote from the system 10 to monitor and control the system 10.

A hydrogen supply monitoring and control module (HSMC unit) 49 is located remote from the HSA 44 and rack 14 and is shown schematically in FIG. 4. The HSMC unit 49 monitors the condition of the HSA 44 and controls the discharge of hydrogen gas from the HSA 44 by controlling the HSA hydrogen control valve 46 and/or additional valves (not shown) coupled to one or more tanks 23. The HSMC module 49 is communicative with and receives data from pressure and flow rate meters 104, 106 from the hydrogen supply assembly 44 via input contacts. The HSMC module 49 also is communicative with and receives data concerning the status of the exhaust fan 60 and a hydrogen concentration sensor 108 located inside the enclosure housing the HSA 44. The HSMC module 49 is communicative with the MAC controller 17.

The system 10 can be operated in two distinct modes. The operating mode depends on whether the system 10 acts as a charger for maintaining the charge in a bank of back-up batteries coupled to the battery terminal 64, or whether the system 10 provides back up power directly to devices coupled to outlets 32, 34, 36, 38. When acting as the direct back-up power supply, the fuel cell stacks 12 are shut off and the outlet valve 46 is closed when the primary power source is supplying power to the station. When the primary power source sensor 102 detects that the primary power source is interrupted, the MAC module 17, HSMC module 49 and exhaust fan 60 switch over to battery power from batteries inside the fuel cell stacks 12.

Then, when the following conditions are met, the HSMC module 49 and MAC module 17 instruct the fuel cell stacks 12 to activate:

primary power source sensor 102 indicates primary power source interrupted;

exhaust fan 60 is operating;

hydrogen sensor 108 indicates that hydrogen concentration is within acceptable parameters, and fuel cell stacks 12 are in operating condition and is ready to accept fuel.

The HSMC module 49 then opens the control valve 46 and hydrogen starts to flow from the tanks 23 to the fuel cell stacks 12. The MAC controller 17 monitors the output of the fuel cell stacks 12 via meters 88, 90, 92, 94, 96, 98, and communicates this data to an operator via the communications network connection 108. The operator can manually shut off the system 10, or isolate individual terminals 62, 64 and outlets 32, 34, 36, 38 of the system 10 via the MAC controller 17. Alternatively, the controller 17 can be a programmable logic device programmed to monitor and control the operation of the system 10 automatically.

When the system 10 acts as a charger for a bank of back-up batteries, a sensor in the batteries is connected to the MAC module 17 and monitors the charge level in the batteries. When the charge drops below a predefined threshold, the fuel cell stacks 12 are started in the same way as described above.

Figure 5A:
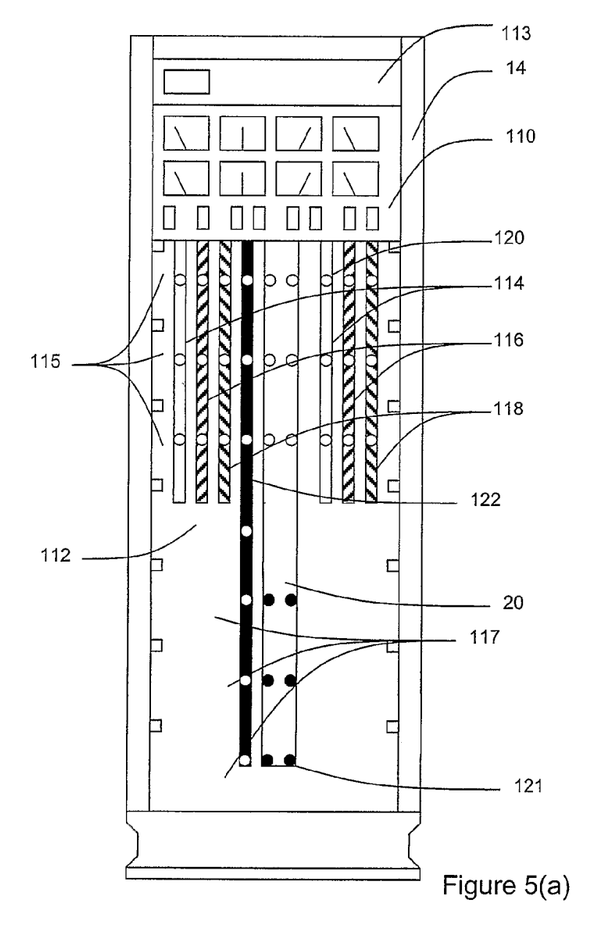

According to a second embodiment of the invention, and referring to FIG. 5(a), the metering and power conversion module 16 is replaced by a metering module 110, and all power conversion is performed by separate power conversion modules 18 that can be mounted in the rack 14 and electrically connectable together and to electrically powered devices via an output bus assembly 112. Furthermore, rack control and hydrogen supply control are combined with monitoring, annunciation and communications control into a single control module 113 mounted on the rack 14. By modularizing all of the power conversion components, this system 10 can be easily configured to meet the specific power needs of a particular site. The output bus assembly 112 enables the power conversion components to be easily swapped, therefore enabling the system 10 to be easily reconfigured to meet different power needs.

The metering module 110 is similar to the metering and power conversion module 16 except that it does not contain any power conversion device. Instead, the metering module 110 is provided with displays that are electrically communicative with the power conversion devices 118 via the output bus assembly 112. In the embodiment shown in FIG. 5(a), three rack bays immediately below the metering module 110 are available for receiving three power conversion modules 18 ("power conversion module bays 115"), and the bottom four rack bays are available receiving four fuel cell stacks 12 ("fuel cell stack bays 117"). To electrically couple up to three power conversion modules 18 to the rack 14, three sets of buses are provided in the output bus assembly 112, namely, first, second and third buses 114, 116, 118. Each bus 114, 116, 118 comprises a pair of parallel, spaced electrically conductive strips (positive and negative strips) that extend vertically along the back of rack 14. The top end of the buses 114, 116, 118 are electrically coupled to the meters in the metering module 110; the bottom end of the buses 114, 116, 118 extends downwards to the lowest power conversion module rack bay 115. Positive and negative connectors 120 are provided at spaced intervals along the positive and negative strips of each bus 114, 116, 118; the connectors 120 are spaced so that one set of positive and negative terminals are provided for each power conversion module rack bay 115. Also, multiple power outlets (not shown) are provided at the back of each bus pair 114, 116, 118. The power output rating for each outlet depends on the power conversion module 18 coupled to the corresponding bus pair. One or more electrically powered devices can be electrically coupled to the system 10 via these power outlets.

The DC bus 20 extends vertically along the back of the rack 14 from the lowest fuel cell stack rack bay 117 to the highest power conversion module rack bay 115; the DC bus 20 has vertically spaced electrical connectors 121 for coupling to the power output terminals of each fuel cell stack 12 and to the power input terminals of each power conversion module 18. The DC bus 20 also has multiple power outlets (not shown) for coupling to electrically powered devices that operate at the same VDC output as the stacks 12, which in this embodiment is 48 VDC.

A communications bus 122 extends vertically along the back of the rack from the rack bay to the control module 113. The communication bus 122 communicatively links the control module 113 to the installed fuel cell stacks 12, power conversion modules 18, and metering module 110.

It is within the scope of the invention to reconfigure the system 10 to have a different number and combination of fuel cell stacks 12 and power conversion modules 18. For example, if additional power conversion module bays are desired to receive additional power conversion modules 18, then additional buses in the bus assembly 112 can be provided.

Figure 5B:
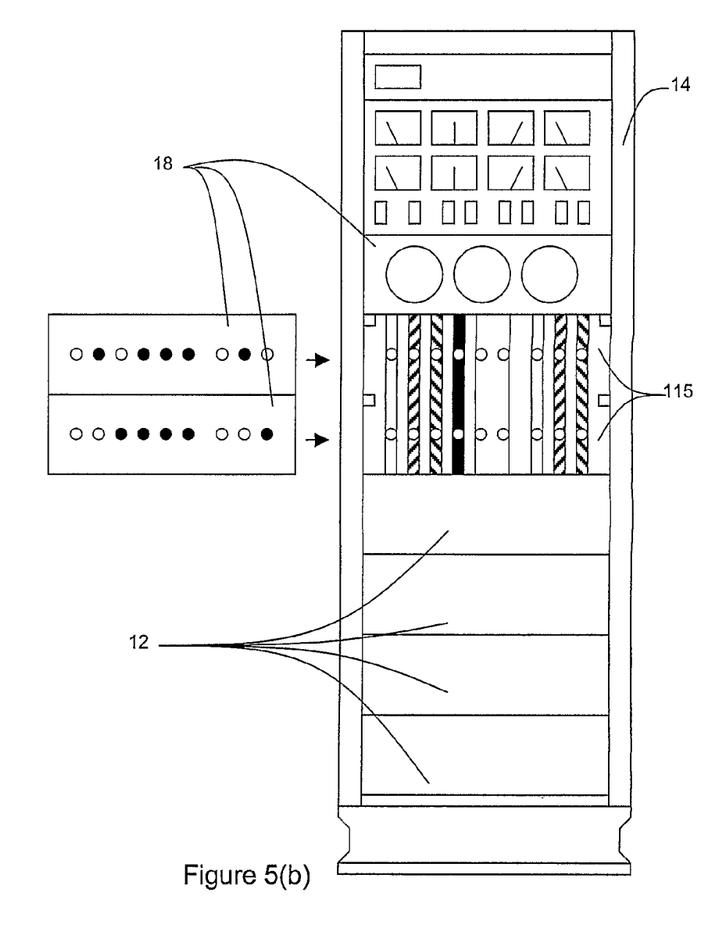

Referring to FIG. 5(b), each power conversion module 18 has power output terminals positioned to mate with one of the buses 114, 116, 118 when the power conversion module 18 is mounted in one of the power conversion module rack bays 115. In this Figure, a DC-AC inverter 18 is shown mounted in the top power conversion rack bay 115 with output terminals connected to the first bus 114. The back of two DC-DC converters 18 are also shown each having power output terminals 124 positioned to connect to the $2^{nd}$ and $3^{rd}$ buses 116, 118, respectively. The inverter and converters 18 also have input terminals to connect to the DC bus 20 and receive 48 VDC power therefrom, and a communications terminal to connect to the communications bus 122.

In this embodiment, the inverter is a 120 VAC inverter and the two DC-DC converters are a 48-24 VDC converter and a 48-12 VDC converter respectively. However, inverters and converters having different outputs can be easily substituted or added. The rack size can be changed to accommodate a different number of power conversion devices. This provides the system 10 with a high degree of flexibility in adapting to a site's particular power needs. Also, the use of standardized rack 14 enables the system 10 to easily fit in rooms designed to accept such racks.

While the embodiment shown in FIGS. 5(a) and (b) has each power conversion module 18 coupled to a different output bus, multiple power conversion modules 18 can be coupled to the same output bus to offer redundancy in the event one of the power conversion modules 18 fail, or, to combine power conversion modules to meet the load demanded on that particular output bus. For example, a pair of power conversion modules 18 rated at 1 kW can be coupled to the same output bus in a redundancy configuration wherein the load on the output bus is limited to 1 kW, or in an additive configuration wherein the load on the output bus is greater than 1 kW.

Like the output bus assembly 112, the DC power bus 20 is a vertically conductive strip that is vertically mounted along the back of the rack 14. The DC power bus 20 extends through the bottom three rack bays and is provided with vertically spaced fuel cell stack connectors 121 in each of these three bays; negative and positive connectors 121 in these bays mate with the power output terminals of the fuel cell stacks 12 mounted in the bays. The DC power bus 20 extends through the three power conversion module bays and has three sets of connectors 128 vertically spaced so that one set of connectors 128 corresponds to each power conversion module bay. A power conversion device 18 mounted in one of these bays has input terminals positioned to connect to one of the DC bus connectors 128; once connected, the electrical output produced by the fuel cell stack 12 will be transmitted via the DC power bus 20 to each power conversion module 18, wherein DC to DC or DC to AC conversion takes place. Output from each power conversion module 18 is transmitted via the output bus assembly 112 to devices coupled to the outlets of the output bus assembly 112.

According to an alternative embodiment of the invention, the four stacks 12 can be connected in parallel (not shown); in such case, the total stack output is 24 VDC through the DC power bus 20. Power conversion devices 18 can be provided to transform the voltage to different levels, e.g. 48 VDC, 12 VDC. An electrical switch (not shown) is provided for each stack 12. The switches can be communicative with and controlled by the MAC module 17. Via the MAC module 17, the switch can be closed to enable the associated stack 12 to supply power to the power bus 20, and opened to electrically disconnect the stack from the bus 20. Such switching can be hard or electronic, as is well known in the art. A disconnected stack 14 can be physically removed from the rack 14 for servicing or repair, and/or replaced with a new stack 12. The system 10 can be designed with "N+1" redundancy and "hot-swapping" capability by providing one more stack 12 than the "N" number of stacks 12 required to provide full power to the design load on the power bus 20. For example, when four stacks 12 are required to meet the design load, the rack 14 is fitted with five stacks 12 in five rack bays. Four of the stacks 12 are electrically coupled to the power bus 20, and the last stack 12 is uncoupled and in cold standby mode. When one of the four operating stacks 12 has failed, or requires removal for servicing, repair etc., the MAC module 17 will open the switch to that stack 12, and close the switch to the standby stack 12, which is then activated. The electrically decoupled stack 12 can then be removed from the rack 14 without stopping operation of the system 10, i.e. stacks 12 can be "hot-swapped" from the system 10.

According to yet another embodiment of the invention, the system 10 is designed with N+1 redundancy, and the fuel cell stacks 12 are operated in a load sharing or "hot standby" mode. Using the same five stack example above, all five stacks 12 are activated, and the load is shared amongst the five stacks 12. Since the stacks 12 are operating at partial capacity, the operating stress on each stack is reduced. However, if one of the stacks 12 fails, the load is redistributed to the remaining four stacks. The circuitry required to perform such switching is well known in the art and thus not described here. The failed stack 12 can be removed from the rack 14 for repair, and replaced with a functioning stack.

Figure 6:
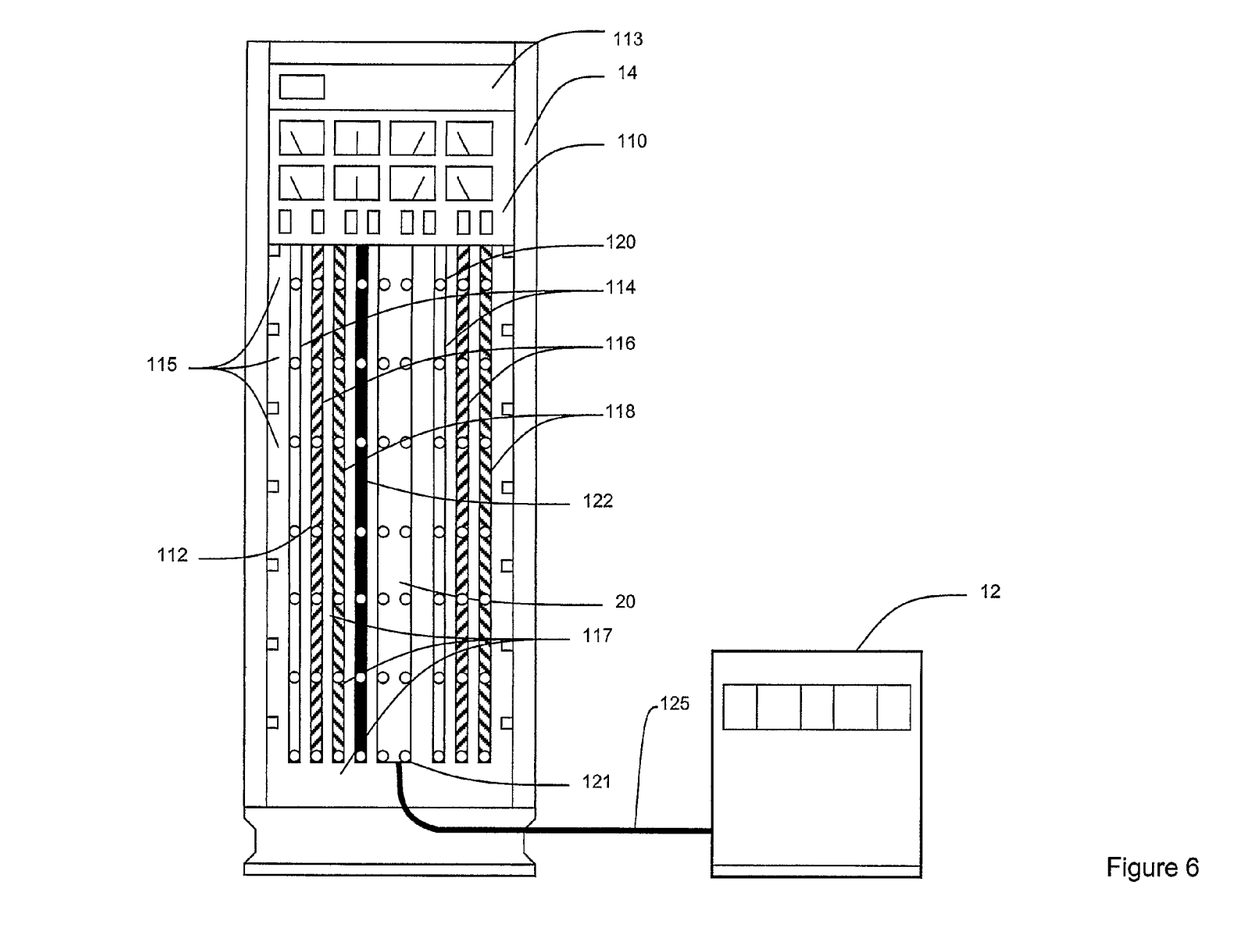
FIG. 6 is a schematic front view of an alternative embodiment of the fuel cell generation system, wherein an external fuel cell stack is electrically coupled to a relay rack.

According to yet another alternative embodiment of the invention and referring to FIG. 6, some or all the fuel cell stacks 12 are located remote from the rack 14, and coupled to the power bus 20 by an extension power cable 125. This alternative design frees us space in the rack 14 for additional power conversion modules 18, and provides the system 10 with the added flexibility of using fuel cell stacks 12 that do not conform to the rack specifications. While FIG. 6 shows one fuel cell stack 12 electrically coupled to the rack 14, multiple fuel cell stacks 12 can be electrically coupled to the rack 14 within the scope of the invention.

While the present invention has been described herein by the preferred embodiments, it will be understood to those skilled in the art that various changes may be made and added to the invention. The changes and alternatives are considered within the spirit and scope of the present invention.

What is claimed is:

1. An electric power generator comprising:
   (a) a rack having multiple module bays, wherein some of the bays are power conversion module bays and fuel cell bays;
   (b) at least one fuel cell stack mounted in one of the fuel cell bays;
   (c) at least one power conversion module removably mounted in one of the power conversion module bays and electrically coupled to the fuel cell stack, wherein the at least one power conversion module converts the voltage level and/or current type of some of the electricity produced by the stack such that the generator can simultaneously output electricity at multiple voltage levels and/or current types; and
   (d) an output bus assembly comprising multiple output buses each electrically communicative with at least one of the power conversion module bays and each output bus having a specified power conversion rating and at least one outlet for coupling to at least one electrically powered device;
   wherein each output bus occupies a different position in the power conversion module bays, and each power conversion module has an output terminal positioned to electrically couple only to the output bus having the same power conversion rating when the power conversion module is mounted in the power conversion module bay.

2. An electric power generator as claimed in claim 1 wherein the at least one power conversion module comprises at least one DC-DC converter module and at least one DC-AC inverter module.

3. An electric power generator as claimed in claim 1 wherein at least one bay is a fuel cell stack bay, the generator further comprises a power bus electrically communicative with the fuel cell stack bay and the at least one power conversion module, and each fuel cell stack is removably mountable to each fuel cell stack bay and configured to electrically couple to the power bus when mounted.

4. An electric power generator as claimed in claim 1 wherein each output bus has at least one outlet for coupling to an electrically powered device.

5. An electric power generator as claimed in claim 3 further comprising a metering module mounted in one the bays and having meters that are electrically communicative with the output bus assembly and power bus.

6. An electric power generator as claimed in claim 2 further comprising a metering and power conversion module mounted in one of the bays and having meters that are electrically communicative with the output bus assembly and power bus, and at least one power conversion module electrically coupled to the power bus.

7. An electric power generator as claimed in claim 1 wherein the generator has a design load and at least one more fuel cell stack than is required to meet the design load, the generator further comprising means for electrically decoupling at least one fuel cell stack from the generator and switching an operating load to the remaining coupled fuel cell stack or stacks.

8. An electric power generator as claimed in claim 7 wherein the operating load is shared between all the fuel cell stacks.

9. An electric power generator as claimed in claim 7 wherein the operating load is shared between the minimum number of fuel cell stack or stacks required to meet the design load, and the remaining fuel cell stack or stacks are electrically decoupled from the generator.

10. An electric power generator as claimed in claim 1, wherein a power conversion module only plugs into a bay with an output bus having the same power conversion rating, to the exclusion of other bays.

* * * * *